United States Patent
Vanderspool, II

[11] Patent Number: 6,108,558
[45] Date of Patent: Aug. 22, 2000

[54] METHOD FOR CALCULATING A LOCATION OF A REMOTE UNIT UTILIZING OBSERVED TIME DIFFERENCE (OTD) AND REAL TIME DIFFERENCE (RTD) MEASUREMENTS.

[75] Inventor: Jan P. Vanderspool, II, Woodstock, Ill.

[73] Assignee: Motorola, Inc., Schaumburg, Ill.

[21] Appl. No.: 09/290,589

[22] Filed: Apr. 13, 1999

Related U.S. Application Data
[60] Provisional application No. 60/082,527, Apr. 21, 1998.

[51] Int. Cl.[7] ................................................ H04Q 7/20
[52] U.S. Cl. .................. 455/456; 455/422; 455/67.6; 342/450; 342/457
[58] Field of Search ................................. 455/456, 433, 455/432, 436, 437, 438, 439, 440, 67.1, 67.6, 422, 457; 342/450, 457, 464

[56] References Cited

U.S. PATENT DOCUMENTS

| | | | |
|---|---|---|---|
| 5,512,908 | 4/1996 | Herrick | 342/387 |
| 5,600,706 | 2/1997 | Dunn et al. | 455/456 |
| 5,666,662 | 9/1997 | Shibuya | 455/456 |
| 5,719,584 | 2/1998 | Otto | 342/465 |
| 5,815,538 | 9/1998 | Grell et al. | 375/356 |
| 5,970,414 | 10/1999 | Bi et al. | 455/456 |
| 6,002,936 | 12/1999 | Roel-Ng et al. | 455/456 |

*Primary Examiner*—Fan Tsang
*Assistant Examiner*—Congvan Tran
*Attorney, Agent, or Firm*—Kenneth A. Haas

[57] ABSTRACT

Base stations (101, 103, and 105) transmit, and a remote unit (117) receives a radio frequency (RF) location signal. The remote unit (117) then computes an observed-time-difference (OTD) for each base station at particular time $t1$. Observed differences in received signal times, and are reported to a Mobile Location Center (MLC) (111). Additionally, a Real-Time-Difference receiver (115) receives an RF signal from two or more base stations. The Real Time Differences between the base stations (101, 103, and 105) are computed at a second time. These differences are also reported to the MLC (111). The MLC (111) computes an estimated RTD for the time period $t_1$ via standard curve fitting algorithms, or simple interpolating algorithms. A corrected Time Difference of Arrival (TDOA) as determined by the remote unit (117) is computed based on the OTD measurements and the estimated RTD measurements.

11 Claims, 3 Drawing Sheets

METHOD FOR CALCULATING A LOCATION OF A REMOTE UNIT UTILIZING OBSERVED TIME DIFFERENCE (OTD) AND REAL TIME DIFFERENCE (RTD) MEASUREMENTS.

This application claims benefit of provisional application Ser. No. 60/082,527, filed Apr. 21, 1998.

FIELD OF THE INVENTION

The present invention relates generally to cellular communication systems and, in particular, to a method and apparatus for locating a remote unit within such communication systems.

BACKGROUND OF THE INVENTION

Radio location techniques that utilize a signal's Time Difference of Arrival (TDOA) have been widely used in many mobile transmitter location systems. The technique utilizes the propagation delay of the radio signal to infer the geographic distance. Three or more propagation delay measurements allow location computation. TDOA techniques can be applied to either the uplink signals received by the base stations from the mobile or the downlink signals transmitted from the base stations received by the mobiles. The use of uplink signals for location computation is commonly referred to as Time of Arrival (TOA). For the TOA case the mobile originates a signal having a single clock reference (the mobile's clock) and the base stations must measure the receive time using a sufficiently accurate multiple clocks. The use of downlink signals is commonly referred to as Enhanced Observed Time Difference (OTD). For the OTD case the base stations must have a sufficiently accurate known start time and the mobile provides the receive time measured against a single clock reference. Three or more base stations are used for either the TOA or OTD methods.

Both the TOA and OTD methods share an aspect of geometry having a three to one ratio as well as one end of the measurement being at known location(s). For the TOA method, a signal originating from a single mobile is measured by three or more geographically known measurement locations. For the OTD method, signals originating from three or more geographically dispersed signal sources (base stations at known locations) are measured by a single receiver (mobile). Due to the single end aspect of one end of the measurement combined with the known location(s) at one end of the measurement, for the purpose of location computation, it is simply an algebraic manipulation as to whether the propagation delay measurements are considered as three or more individual propagation delay numbers or two or more time-differences.

The end of the measurement at the geographically disbursed locations (e.g., base stations) require the utilization of a reference clock ("internal clock") with a rate sufficiently accurate to limit the amount of error introduced by any time drift. Rather than synchronize all locations to a common clock reference such as GPS or to use highly stable clocks at all locations, it is accepted practice to allow timing errors at the base stations. The errors are measured by a receiver device. This Real Time Difference (RTD) receiver reports the time differences referenced to a sufficiently stable internal clock. The TOA or OTD data and the RTD data is sent to a single computation location. These measurement and data collection processes (TOA/OTD data vs. RTD data and location computation) are asynchronous and may be made at different points in time. When TOA or OTD data measured at time $t_1$ are used with RTD data measured at time $t_2$, the actual RTD at $t_1$ is not known and the computation is in error by that amount. For accurate location calculations, there is a need to provide a method whereby this error can be removed while allowing the measurement processes to remain asynchronous.

DETAILED DESCRIPTION OF THE DRAWINGS

Figure 1:
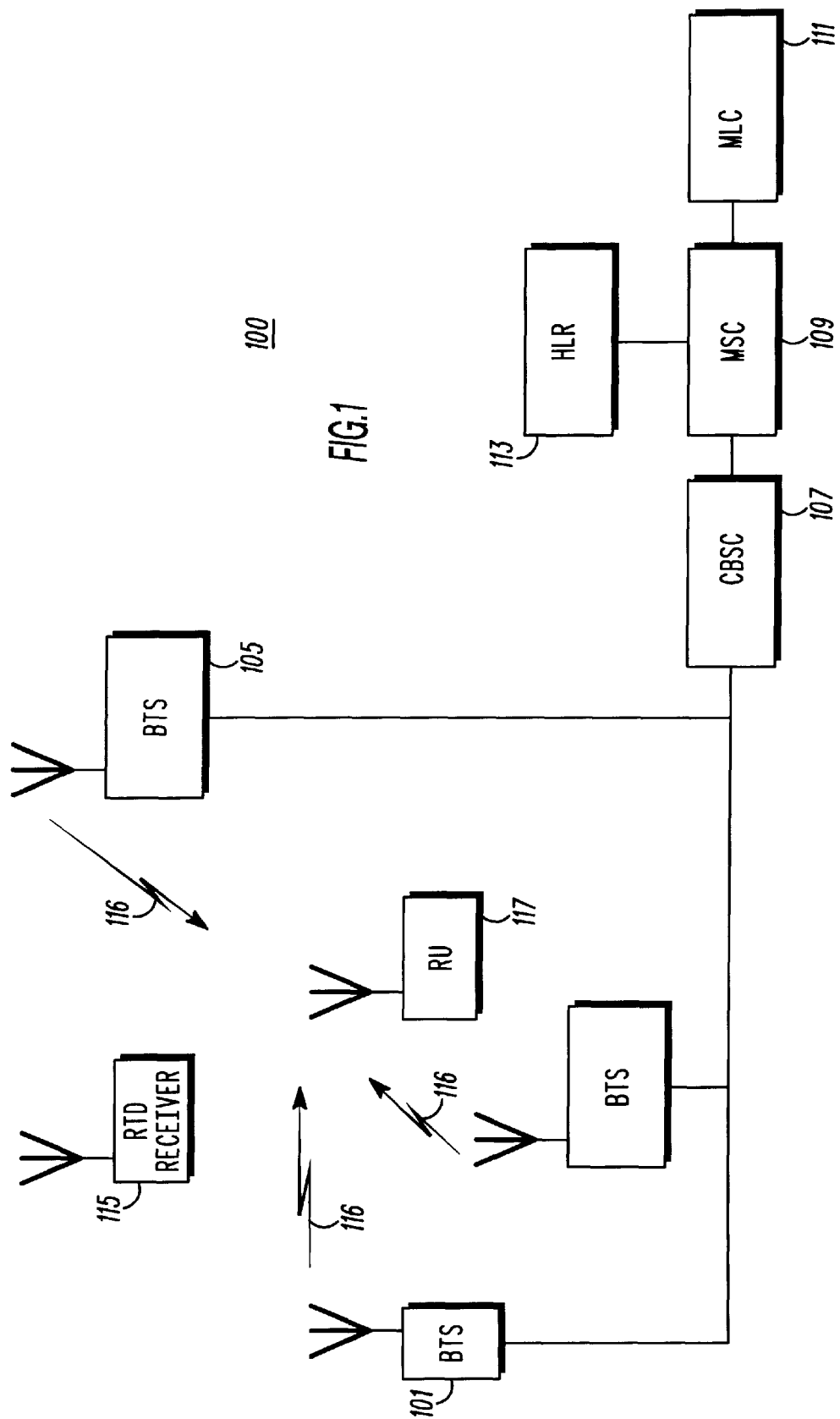
FIG. 1 is a block diagram showing a communication system in accordance with the preferred embodiment of the present invention.

To overcome the problems described above, base stations transmit, and a remote unit receives a radio frequency (RF) location signal. The remote unit then computes an observed-time-difference (OTD) for each base station at particular time $t_1$. The remote unit also time stamps each base station measured based on the air interface TDMA structure. (In the preferred embodiment for GSM, the frame number is used.) Observed differences in received signal times plus time stamps are reported to a Mobile Location Center (MLC). Additionally, a Real-Time-Difference receiver receives an RF signal from two or more base stations. The Real Time Differences between the base stations are computed at a separate time $t_2$ differing from time $t_1$. The RTD receiver also time stamps measurements based on the air interface TDMA structure. These differences are also reported to the MLC and are acted upon (a computation is made) at time t3 occurring after time $t_1$ and $t_2$. In the preferred embodiment, historical raw data is retained at the MLC for a sufficient time to allow curve fitting. The MLC computes an estimated RTD at the time period $t_1$ via standard curve fitting algorithms, or simple interpolating or extrapolating algorithms. Alternatively, the curve fit data is available from any appropriate part of the location measurement system. A corrected Time Difference of Arrival (TDOA) as determined by the remote unit is computed based on the OTD measurements and the curve-fit RTD measurements.

Because RTD data utilized in calculating TDOA measurements is predicted RTD data at the time period when OTD data was taken by the remote unit, a more accurate measurement of location can be performed by the MLC. More particularly, prior-art procedures of locating a remote unit utilized the RTD data that was obtained at time period $t_2$ differing from $t_1$ in the calculation of the remote unit's location. Unlike the prior art methods of calculating location, a more accurate method for calculating location is utilized that predicts the RTD data for time period $t_1$. This leads to location estimates having a greater accuracy than with prior-art location techniques.

The present invention encompasses a method for locating a remote unit within a communication system. The method comprises the steps of receiving a plurality of measurements from a remote unit of OTDs for a plurality of base stations, and receiving a measurement of RTD for the plurality of base stations performed at a second time period. In the preferred embodiment of the present invention the plurality of OTD measurements were performed at a first time period. A predicted RTD is calculated for the plurality of base stations at the first time period, and a location is calculated for the remote unit based on the OTD measurements and the predicted RTD for the plurality of base stations at the first time period.

The present invention additionally encompasses a method for locating a remote unit within a communication system. The method comprises the steps of receiving a radio-frequency (RF) location signal transmitted via a downlink signal, computing an observed-time-difference OTD for each base station at a first time period, and computing a time period when the location signal was received. The OTD measurement is reported to infrastructure equipment (along with the time period) for locating the remote unit.

Finally, the present invention encompasses a method for locating a remote unit within a communication system. The method comprises the steps of receiving a request to locate the remote unit, sending a downlink location signal to the remote unit, and performing a series of OTD measurements to obtain OTD data at a first time period. RTD measurements for a plurality of base stations are obtained at a second time period. The OTD and RTD measurements are reported to a location center along the first and the second time period, and an RDT measurement a the third time period is predicted based on the RTD measurements. Finally, the remote unit is located based on the predicted RTD measurement and the OTD measurements.

Turning now to the drawings, where like numerals designate like components, FIG. 1 is a block diagram showing a communication system 100 in accordance with the preferred embodiment of the present invention. In the preferred embodiment of the present invention, communication system 100 utilizes a Global System for Mobile Communications (GSM) protocol, but in alternate embodiments communication system 100 may utilize other analog or digital cellular communication system protocols such as, but not limited to, the Code Division Multiple Access (CDMA) system protocol as described in Cellular System Remote unit-Base Station Compatibility Standard of the Electronic Industry Association/Telecommunications Industry Association Interim Standard 95 (TIA/EIA/IS-95A), the Narrowband Advanced Mobile Phone Service (NAMPS) protocol, the Advanced Mobile Phone Service (AMPS) protocol, the Personal Digital Cellular (PDC) protocol, or the United States Digital Cellular (USDC) protocol.

Communication system 100 includes Base Transceiver Stations (BTSs) 101, 103, and 105, remote unit 117, Real-Time-Difference (RTD) receiver 115, Centralized Base Station Controller (CBSC) 107, Mobile Switching Center (MSC) 109, and Mobile Location Center (MLC) 111. In the preferred embodiment of the present invention base stations 101–105 are preferably Motorola base stations, MSC 109 is preferably a Motorola MSC, and CBSC 107 is preferably comprised of a Motorola CBSC component. As shown, remote unit 117 is receiving communication from base stations 101, 103, and 105. Base stations 101–105 are suitably coupled to CBSC 107 and communicate to remote unit 117 via downlink communication signals 116. Although RTD receiver 115 is shown existing as a separate entity, in alternate embodiments of the present invention, RTD receiver may be combined with other network elements (e.g., MSC 109, MLC 111, . . . , etc.).

Operation of communication system 100 occurs as follows: To initiate a location request, a command is originated at a regional entity such as MSC 109, MLC 111, or perhaps within a connected network such as Public Switched Telephone Network (PSTN) (not shown). The location request, which includes identification information on the remote unit that is to be located enters HLR 113 where it is processed to determine the currently serving base station. Once the currently serving base station (e.g., base station 101) is known, the location request is passed to the appropriate base stations (e.g., neighboring base stations 103 and 105) and remote unit 117. Base stations 101, 103, and 105 transmit, and remote unit 117 receives a radio frequency (RF) location signal transmitted via downlink signal 116. Remote unit 117 then computes an observed-time-difference (OTD) for each base station at particular time $t_1$. Observed differences in received signal times (i.e., $(B-A)_{OTD}$ and $(B-C)_{OTD}$) are reported to the serving base station and ultimately to MLC 111. Additionally, the remote unit calculates and reports a time of the measurement relative to the TDMA air interface structure (reported as the frame number) for the measurement. In the preferred embodiment of the present invention the frame number corresponds to a time period when the downlink location signal was received.

In the preferred embodiment of the present invention RTD receiver 115 receives downlink RF signal 116 from two or more base stations. The Real Time Differences between base stations 101, 103, and 105 are computed at time $t_2$. These differences $(B-A)_{RTD}$ and $(B-C)_{RTD}$ as seen by receiver 115 are also reported to MLC 111. Additionally, the time of the measurement relative to the TDMA air interface structure is reported as the frame number for the measurement. MLC 111 computes an estimated RTD for the time period $t_1$ via standard curve fitting algorithms, or simple interpolating algorithms. More particularly, a series of RTD measurements is taken by RTD receiver 115. Since RTD receiver is stationary, in theory, all RTD measurements for a particular combination of base stations due to propagation delay should be static. Since a base stations internal clock may be drifting with respect to time, RTD measurements, in reality, may not be static, and may vary with respect to time. MLC 111 utilizes information on how a particular RTD measurement for a combination of base stations varies with respect to time to produce an estimated RTD value for the time period $t_1$. A corrected TDOA as determined by remote unit 117 is computed according to the equations:

$$TDOA(B-A)=(B-A)_{OTD}-(B-A)_{RTD}(t_1), \text{ and}$$

$$TDOA(B-C)=(B-C)_{OTD}-(B-C)_{RTD}(t_1),$$

and where $(B-A)_{RTD}(t_1)$ and $(B-C)_{RTD}(t_1)$ are estimates of RTD data at time $t_1$. The TDOA data is then placed into known location calculation equations to compute the location or remote unit 117.

Figure 2:
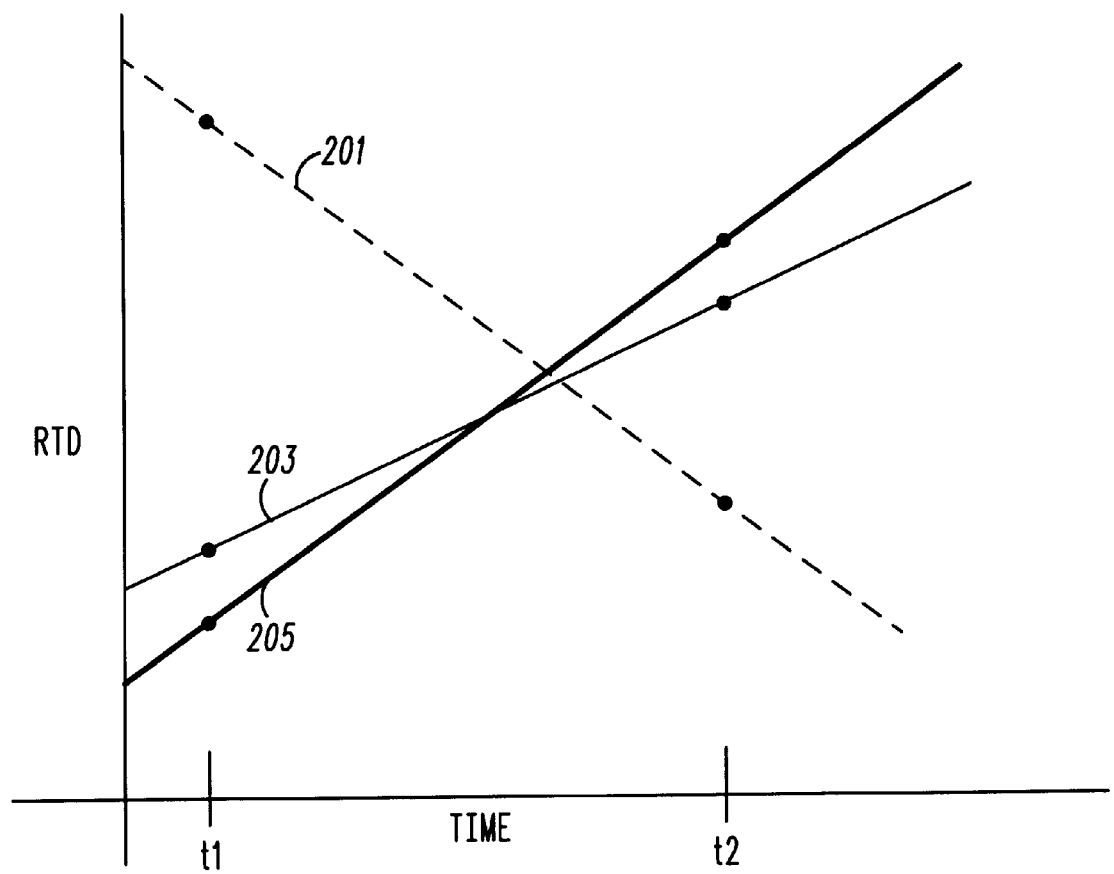
FIG. 2 illustrates Real Time Difference (RTD) as a function of time for the communication system of FIG. 1.

In general, the error due to not using RTD data from coincident points in time with the OTD data may be significant compared to the desired location accuracy. This fact is illustrated in FIG. 2. In FIG. 2 RTD amounts for base stations 101, 103, and 105 are illustrated by lines 201–205, respectively. As is evident, RTD data for all base stations 101, 103, and 105 is a function of time. More particularly, RTD for base stations 103 and 105 has a positive slope indicating the time is advancing due to internal clocks that are fast. Similarly, RTD for base station 101 has a negative slope indicating the time is regressing due to an internal clock that is running slow.

Because RTD data utilized in calculating TDOA measurements is predicted RTD data at the time period when OTD data was taken by remote unit 117, a more accurate measurement of location can be performed by MLC 111. More particularly, prior-art procedures of locating remote unit 117 utilized the RTD data that was obtained at time period $t_2$ in the calculation of the remote unit's location. Unlike the prior art methods of calculating location, a more accurate method for calculating location is utilized that predicts the RTD data for time period $t_1$. This leads to location estimates having a greater accuracy than with prior-art location techniques.

In order for MLC 111 to accurately predict location estimates in accordance with the preferred embodiment of the present invention the time period $t_1$ needs to be provided to MLC 111. In the preferred embodiment of the present invention this is accomplished by remote unit 117 reporting a frame number along with OTD data to the serving base station. The frame number corresponds to a time period when OTD data was collected by remote unit 117. If OTD data is taken by a remote unit for several base stations, over a several-frame time period, then the frame number associated with a time period between the earliest and the latest OTD measurements is reported as the time period ($t_1$) when OTD data was obtained.

Figure 3:
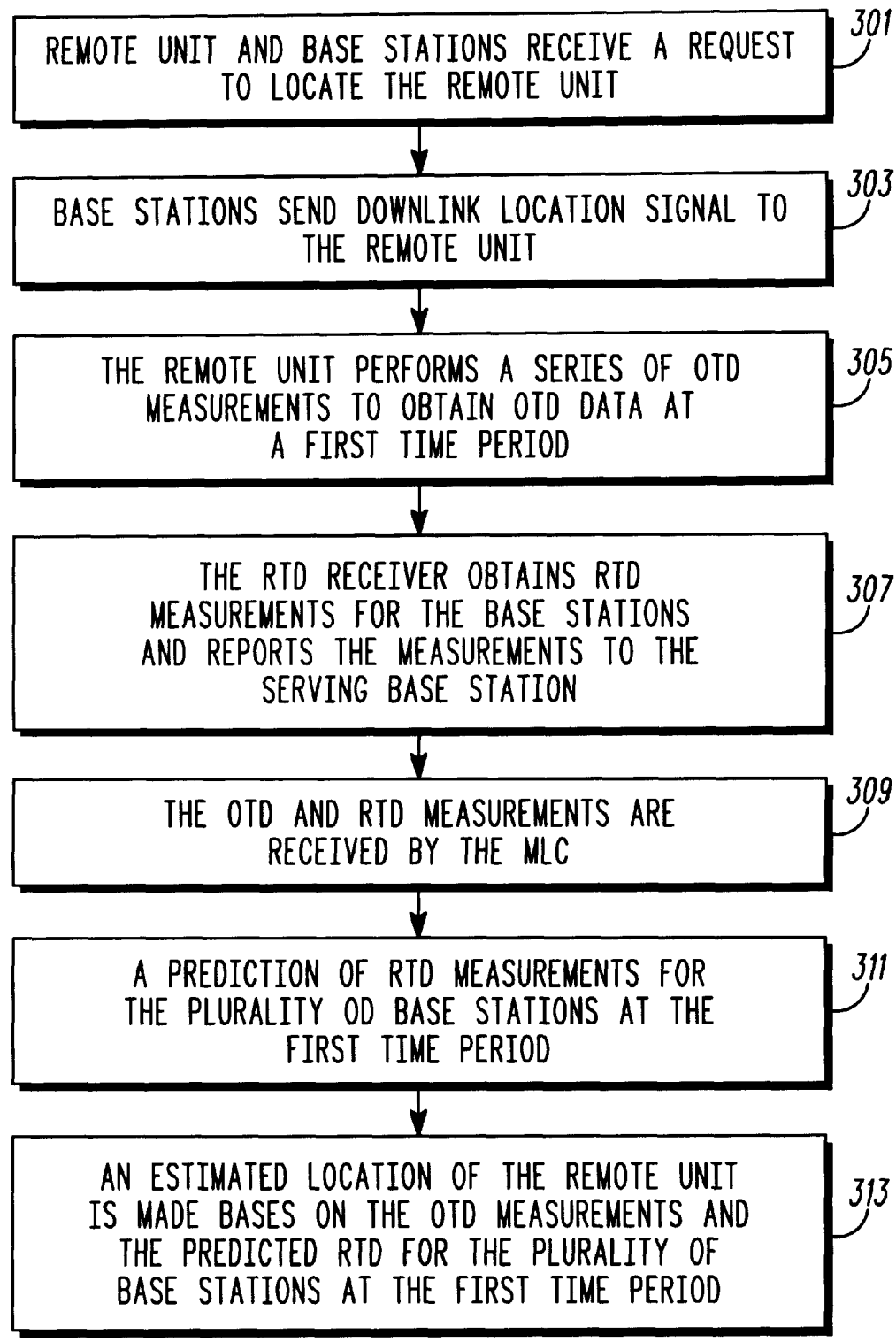
FIG. 3 is a flow chart showing the operation of the communication system of FIG. 1 in accordance with the preferred embodiment of the present invention.

FIG. 3 is a flow chart showing the operation of communication system 100 in accordance with the preferred embodiment of the present invention. The logic flow begins at step 301 where remote unit 117, and base stations 101–105 receive a request to locate remote unit 117. At step 303 base stations 101–105 send downlink location signal (via downlink communication signal 116) to remote unit. At step 305, remote unit 117 performs a series of OTD measurements to obtain OTD data at a first time period. Next, at step 307 RTD receiver 115 obtains RTD measurements for base stations 101–105 and reports the measurements to the serving base station. In the preferred embodiment of the present invention step 307 is performed periodically by RDT receiver 115, regardless of whether location of remote unit 117 is desired. For example, in the preferred embodiment of the present invention RDT receiver takes, and reports RTD measurements every 30 seconds, regardless of whether location estimates are taking place.

Continuing, at step 309 the OTD and RTD measurements are received by MLC 111, and at step 311 a prediction of RTD measurements for the plurality of base stations at the first time period is made. Finally, at step 313 an estimated location of the remote unit is made based on the OTD measurements and the predicted RTD for the plurality of base stations at the first time period.

While the invention has been particularly shown and described with reference to a particular embodiment, it will be understood by those skilled in the art that various changes in form and details may be made therein without departing from the spirit and scope of the invention. For example, the point of computation where the required location data converges for the final calculation may be in the mobile (RU) rather than the MLC. The application of a curve fit algorithm to the RTD data may be in the MCL and delivered to the mobile. Alternatively, the application of a curve fit algorithm to the RTD may be done in the RTD and delivered to the MLC. The number of terms used in the curve fit algorithm (the order of the fit) may vary and be within control of various elements within the location system allowing for multiple solutions to the curve-fit task. The use of frame number in a GSM system could be modified to any higher or lower modulo of the air interface to provide a sufficient accuracy for the intended computational accuracy. The juxtapostion of the location data by interpolation/extrapolation may also be applied to the TOA case. It is intended that all such modifications come within the spirit and scope of the following claims:

What is claimed is:

1. A method for locating a remote unit within a communication system, the method comprising the steps of:

receiving a plurality of measurements from a remote unit of Observed Time Differences (OTDs) for a plurality of base stations, wherein the plurality of OTD measurements were performed at a first time period;

receiving a measurement of Real Time Differences (RTD) for the plurality of base stations performed at a second time period;

calculating a predicted RTD for the plurality of base stations at the first time period; and calculating a location of the remote unit based on the OTD measurements and the predicted RTD for the plurality of base stations at the first time period.

2. The method of claim 1 wherein the step of receiving the plurality of measurements from the remote unit comprises the step of receiving the plurality of measurements from the remote unit of OTDs for the plurality of base stations and a time period when the plurality of OTD measurements were performed.

3. The method of claim 1 wherein the step of receiving the plurality of measurements from the remote unit comprises the step of receiving the plurality of measurements from the remote unit of OTDs for the plurality of base stations and a frame number when the plurality of OTD measurements were performed.

4. The method of claim 1 wherein the step of receiving the measurement of RTD for the plurality of base stations comprises the step of receiving the measurement of RTD along with a time period that the RTD measurement was taken.

5. The method of claim 1 wherein the step of receiving the measurement of RTD for the plurality of base stations comprises the step of receiving the measurement of RTD along with a frame number that the RTD measurement was taken.

6. The method of claim 1 wherein the step of receiving the RTD data for the plurality of base stations comprises the step of receiving two or more raw RTD measurements along with frame numbers for when the RTD measurements were taken.

7. The method of claim 1 wherein the step of receiving the RTD data for the plurality of base stations comprises the step of receiving RTD data in curve fit form.

8. A method for locating a remote unit within a communication system, the method comprising the steps of:

receiving a request to locate the remote unit;

sending a downlink location signal to the remote unit;

performing a series of Observed Time Difference (OTD) measurements to obtain OTD data at a first time period;

obtaining Real Time Difference (RTD) measurements for a plurality of base stations, wherein the RTD measurements are taken at a second time period;

reporting the OTD and RTD measurements to a location center along with the first and the second time period;

predicting an RDT measurement at the third time period based on the RTD measurements; and locating the remote unit based on the predicted RTD measurement and the OTD measurements.

9. The method of claim 8 wherein the step of performing a series of OTD measurements comprises the step of performing a series of OTD measurements by the remote unit.

10. The method of claim 9 wherein the step of performing RTD measurements comprises the step of performing RTD measurements comprises the step of performing RTD measurements by a network element separated from the remote unit.

11. The method of claim 8 wherein the step of reporting the OTD and RTD measurements to the location center comprises the steps of:

reporting, by the remote unit, the OTD measurement along with a first frame number; and reporting, by a network element separated from the remote unit, RTD measurements along with a second frame number.

* * * * *